United States Patent

Saville et al.

Patent Number: 5,116,143
Date of Patent: May 26, 1992

[54] HIGH LOAD CAPACITY JOURNAL FOIL BEARING

[75] Inventors: Marshall P. Saville, Lawndale; Alston L. Gu, Rancho Palos Verdes, both of Calif.

[73] Assignee: Allied-Signal Inc., Morris Township, Morris County, N.J.

[21] Appl. No.: 631,591

[22] Filed: Dec. 20, 1990

[51] Int. Cl.⁵ ............................................. F16C 17/03
[52] U.S. Cl. .................................................. 384/106
[58] Field of Search ............... 384/106, 105, 103, 104, 384/100

[56] References Cited

U.S. PATENT DOCUMENTS

| | | |
|---|---|---|
| 4,153,315 | 5/1979 | Silver et al. |
| 4,195,395 | 4/1980 | Silver et al. |
| 4,348,066 | 9/1982 | Agrawal et al. |
| 4,451,163 | 5/1984 | Glaser |
| 4,475,824 | 10/1984 | Glaser et al. |
| 4,682,900 | 7/1987 | Gu ........................ 384/106 |
| 4,701,060 | 10/1987 | Gu ........................ 384/106 |

Primary Examiner—Lenard A. Footland
Attorney, Agent, or Firm—David B. Abel; Terry L. Miller; Robert A. Walsh

[57] ABSTRACT

A high load capacity journal foil bearing and more particularly undersprings therefor. The journal foil bearing preferably includes a number of individual pads or foils which are conventionally mounted to a journal and have a pad face proximate a rotating shaft. The undersprings each include a number of curvilinear support beams or corrugations which are varied in width and pitch to optimize the spring force supporting the overlying foil. The underspring is configured to have wider beams at their leading edge and progressively narrower beams for approximately the first one half of the circumferential length.

21 Claims, 5 Drawing Sheets

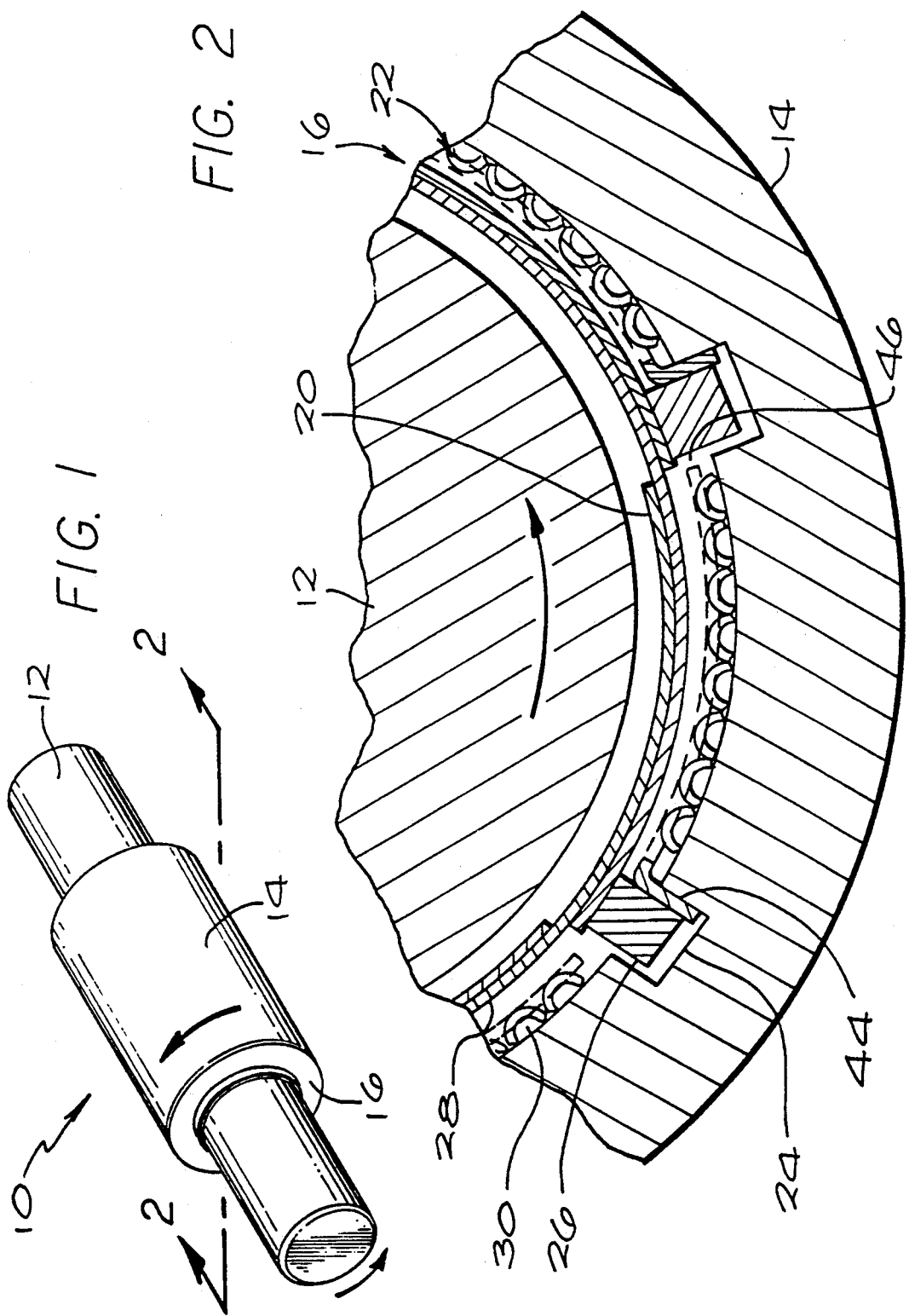

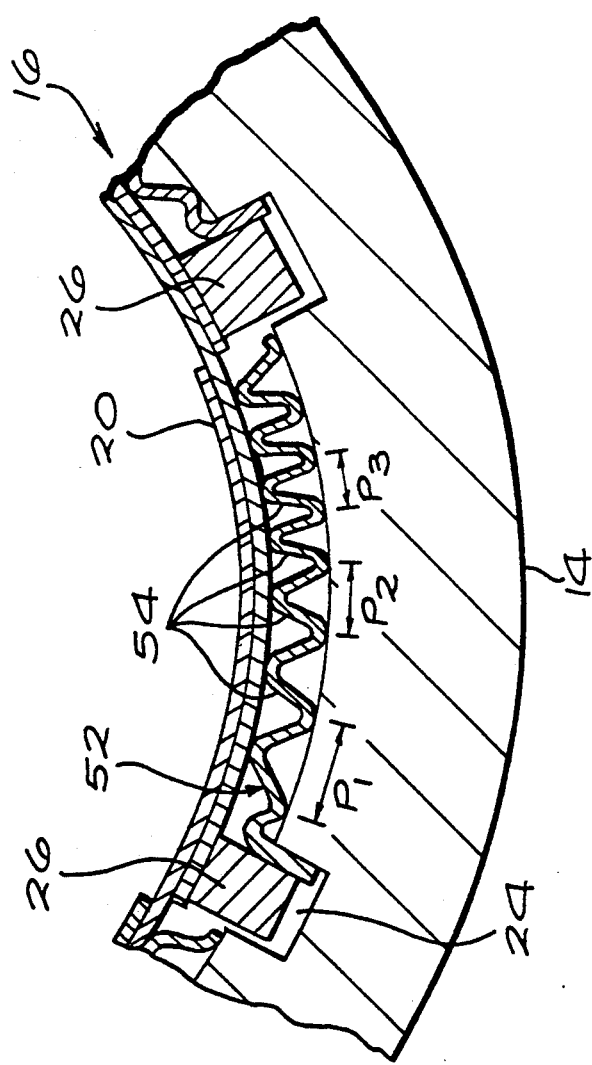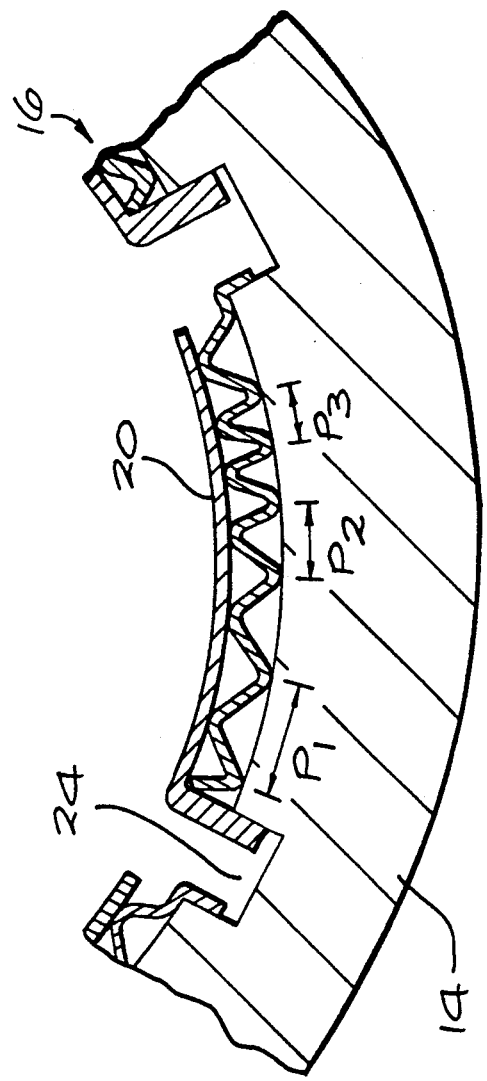
FIG. 5
FIG. 6

HIGH LOAD CAPACITY JOURNAL FOIL BEARING

BACKGROUND OF THE INVENTION

Process fluid or gas bearings are utilized in a number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

Improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they introduce the requirement for an external source of clean fluid under pressure.

In order to properly position the compliant foils between the relatively movable bearing elements, a number of mounting means have been devised. In journal bearings, it is conventional practice to mount the individual foils in a -slot or groove in one of the bearing elements as exemplified in U.S. Pat. No. 3,615,121.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

SUMMARY OF THE INVENTION

The present invention is directed to a high load capacity journal foil bearing and more particularly to undersprings therefore. The journal foil bearing preferably includes a number of individual pads or foils which are conventionally mounted to a journal and have a pad face proximate a rotating shaft. The undersprings each include a number of curvilinear support beams or corrugations which are varied in width and pitch to optimize the spring force supporting the overlying foil. The underspring is configured to have wider beams at their leading edge and progressively narrower beams for approximately the first one half of the circumferential length. This results in a weaker spring force supporting the overlying foil near the leading edge, and a gradually increasing underspring force which reaches and maintains a maximum at about the midpoint of the foil.

The undersprings also include means for reducing the exerted spring force at the axial edges of the foils, to thereby prevent rubbing contact where the dynamic fluid forces are diminished. Preferably, the means for reducing the spring force is accommodated by including cutouts or windows near the axial ends of the curvilinear support beams or corrugations. The cutouts are configured to approximate the spring force to the decrease in the overlying dynamic fluid pressure profile.

BRIEF DESCRIPTION OF THE DRAWINGS

FIG. 1 is a perspective view of a foil journal bearing of the present invention.

FIG. 2 is a partial sectional view of the foil journal bearing taken along line 2—2 of FIG. 1.

FIG. 5 is a sectional view of an alternative configuration for the foil bearing taken along line 2—2 of FIG. 1.

FIG. 6 is an exploded view depicting an alternate mounting arrangement for the underspring of the foil journal bearing of FIG. 1.

DESCRIPTION OF THE PREFERRED EMBODIMENTS

Figure 3:
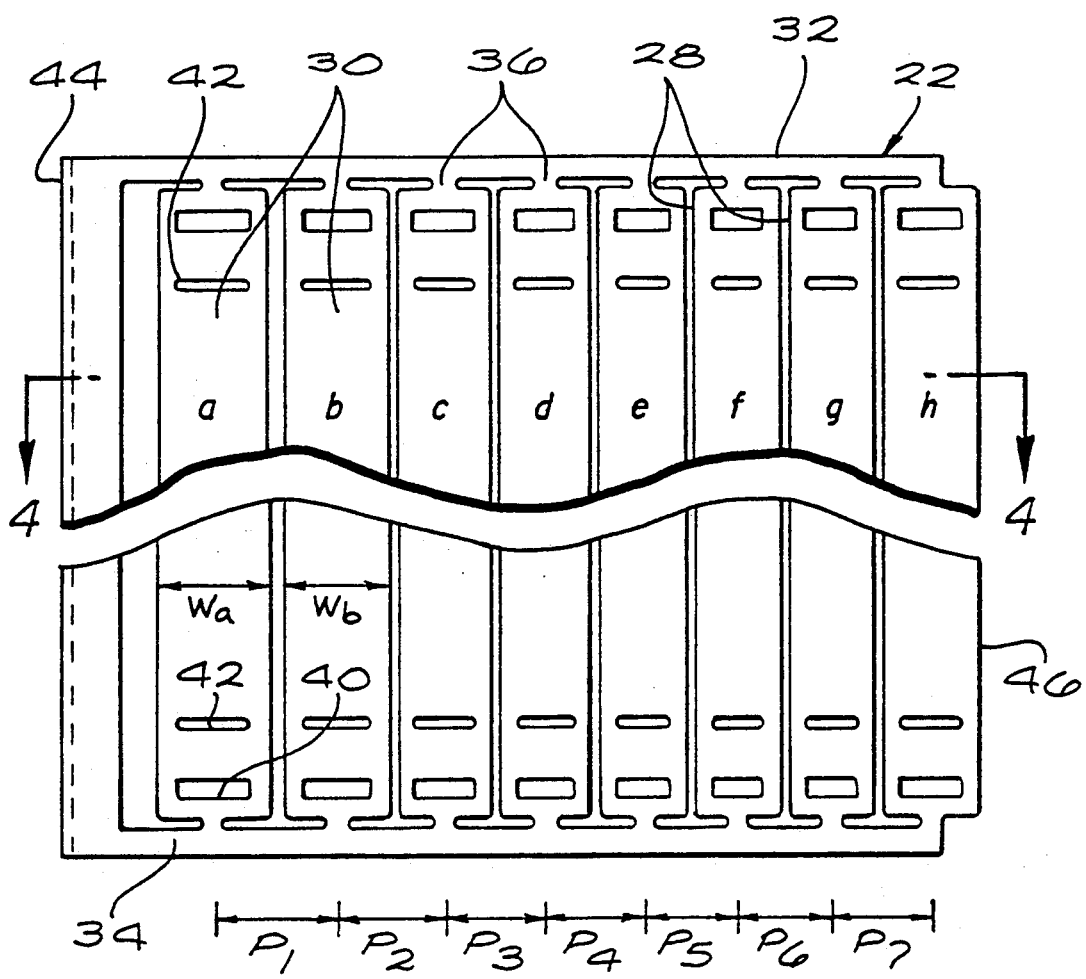
FIG. 3 is a plan view of an underspring of the foil journal bearing of FIG. 1.

As generally illustrated in FIG. 1, The journal bearing 10 includes a shaft 12 rotatably supported within a bushing 14 by means of a foil bearing 16. The foil bearing 16, shown in FIG. 2, generally comprises a plurality of individual, preferably overlapping, compliant foils 20 and a number of individual foil stiffener elements or undersprings 22. Both the foils 20 and undersprings 22 are mounted in axial slots 24 in the bushing 14 in a conventional manner. While the individual curved foils 20, normally of a thin compliant metallic material, such as nickel alloy, stainless steel, or beryllium-copper, are illustrated as having a separate mounting bar 26 at the leading edge thereof, the mounting means may be formed integral with the individual foils or with the foils 20 having mounting means intermediate the ends thereof as shown in U.S. Pat. No. 4,178,046.

The undersprings 22, also normally of a thin compliant metallic material such as nickel alloy, stainless steel, or beryllium-copper, generally have a predetermined curvature. The undersprings 22 include a plurality of axially extending slots 28, defining therebetween a plurality of axially extending curvilinear beams 30, as illustrated in the plan view of FIG. 3. The slots 28 are preferably "I" shaped, and extend a majority of the axial length of the underspring 22. Thus, the curvilinear beams 30 between the slots 28 are connected only to the axial edges 32, 34 of the underspring 22 by short bars 36 defined by the top and bottom crossbeams of said "I" slots 28. The curvilinear beams 30 may also include windows 40, 42 near each axial end of the beams 30, slightly inset from the bars 36. The purpose of the windows 40, 42 at the ends of the curvilinear beams 30 is to reduce the spring force exerted upon the overlying foil 20 proximate the axially outer edges thereof.

As depicted in FIGS. 2 and 3, the underspring 22 has a leading edge 44 (with respect to the direction of rotation of shaft 12) at which it is mounted to the bushing 14, and a trailing edge 46 at the opposite end. In addition, the leading edge of the active surface area of the foils 20, i.e. the area exposed to the relatively rotating member, is configured to overlie the leading edge 44 of the undersprings 22, when assembled.

The curvilinear beams 30 are configured to have a varying width W, and pitch P, depending upon the location of the curvilinear beam 30 between the leading edge 44 and trailing edge 46. By way of example, for a given underspring 22 having curvilinear beams 30 $a$, $b$, $c$, $d$, $e$, $f$, $g$, and $h$, and corresponding widths Wa, Wb, Wc, Wd, We, Wg, Wh) the width Wa for the curvilinear beam 30$a$ proximate the leading edge 44, is greater than the width Wb for the beam 30$b$. Additionally, Wb is preferably greater than Wc, Wc is greater than Wd, and Wd is greater than We. However, it is also desirable to have the widths of the beams 30 approximately equal from the midpoint of the undersprings 22 to near the trailing edge 46. Thus, the widths We, Wf, Wg are approximately equal, while the final width Wh may be greater than Wg.

It may be appreciated that the pitch of the successive curvilinear beams 30 is dependent upon the width of each beam 30, as well as, or in addition to the width of the slots 28 separating the beams 30. Preferably, the height of the beams 30 varies in order to provide a uniform support height or tapered support height for foils 20 while the width of slots 28 can be constant or variable.

The purpose of varying the width of beams 30 between leading edge 44 and trailing edge 46 is to maintain an optimum wedge shape spacing between the surface of the foil 20 and the rotating member 12 matched to the stiffness of the underspring 22 for the changing pressure force along the circumferential length of the foil 20 and underspring 22. By maintaining an approximately optimum wedge shape spacing between the foil 20 and the rotating member 12, the load capacity of the journal bearing 10 can be significantly increased over that of previous designs.

Figure 4:
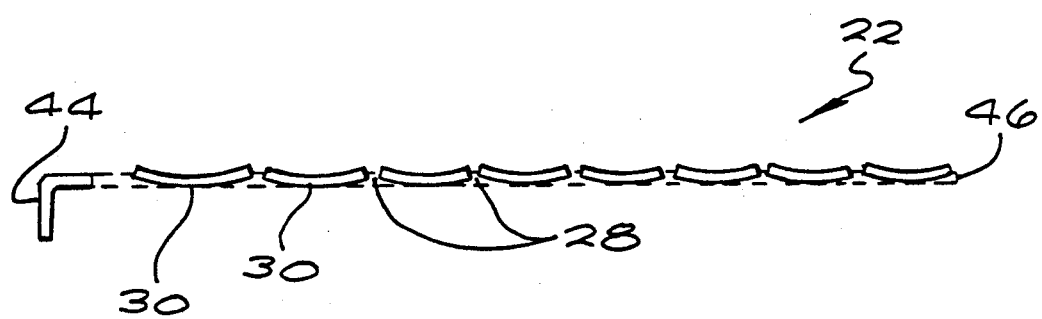
FIG. 4 is a cross sectional view along line 4—4 of FIG. 3 of an alternative configuration for the underspring.

FIG. 4 depicts an alternate arrangement for the curvilinear beams 30, wherein the beams 30 have their edges curving radially inward, toward the bottom surface of the foil 20. The plan view of FIG. 3 is essentially the same for either of the end views of FIGS. 2 or 4.

FIG. 5 depicts an end view of another alternative arrangement of an underspring 52. In this view, the underspring 52 has corrugations 54 instead of the slot and beam configuration of the underspring 22. It should be recognized that while the corrugations 54 are defined by the underspring 52 having a serpentine-like shape in axial view, the underspring 22 also has "corrugations" in the sense that the curvilinear beams 30 cooperatively define alternating ridges and furrows in the axial view, recalling FIGS. 2 and 4. The corrugated underspring 52 is similar, however, in that the width and pitch of the corrugations 54 is longer proximate the leading edge and shorter in the middle of the underspring 52. This variation in the pitch of the corrugations 54 produces a weaker spring force at the leading edge of the foil 20 similar to the construction of FIGS. 2 and 4.

The undersprings 22, 52 of FIGS. 3, 4 and 5 provide varying spring force to support the foil 20 by virtue of the number and spacing of the points of contact between the undersprings beams 30 or corrugations 54 with the foil 20, and bushing 14. In addition, the length of travel or runout of the shaft against the spring force of the underspring before the underspring bottoms out is dependent upon the curvature or height of the curvilinear beams 30 or height of corrugations 54.

The present invention seeks to match the requirements of continuous support and easy fabrication by providing a high number of contact points spaced as close to one another as possible yet allowing significant runout or radial displacement for the shaft 12 in a configuration which can be readily manufactured. Accordingly it is preferable to have the width W for the beams 30 or corrugations 54 to be in the range between 0.025 cm to 1.0 cm. It is also preferable for the width of the first beam 22 or corrugation 54, to be between 2% to 50% greater than the width for any subsequent beam 22 or corrugation 54 for incompressible fluid applications, and up to 500% for compressible fluid applications.

It should also be noted that both the slot-beam configuration and the corrugated configuration are resilient in the event of a high load which bottoms out the underspring 22, 52. Thus, even if a high load is exerted, the beams 30 or corrugations 54 simply flatten out, and can recover their shape when the load is decreased.

An alternate mounting and arrangement for the underspring 22 is depicted in an exploded view in FIG. 6. In this alternative arrangement, the underspring 22 is mounted to the journal 14 by means of a mounting bar or tab 60 at the trailing edge of the underspring 22. This mounting arrangement can be used with any of the previously described configurations for undersprings 22 and 52.

Figure 7:
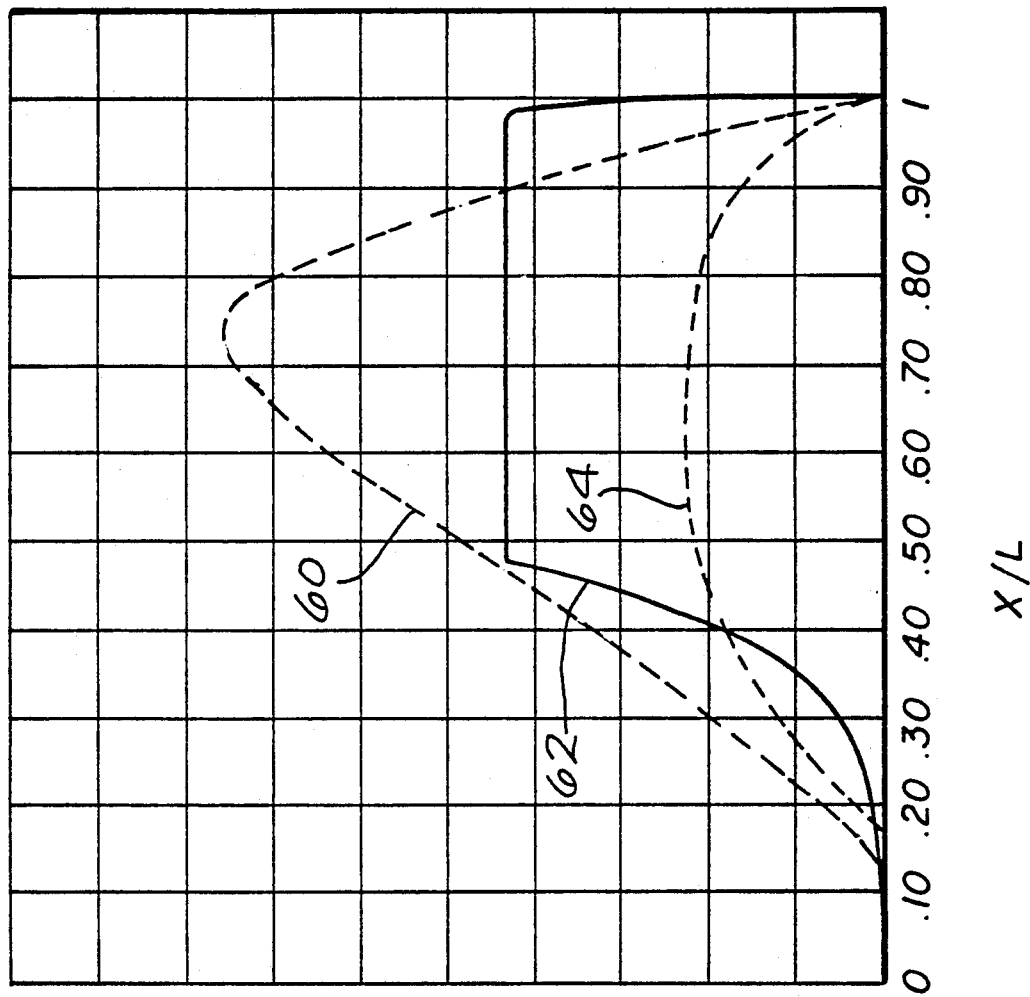
FIG. 7 is a graphical illustration of the pressure exerted on the foil 20 along a circumferential length thereof for a compressible fluid and for an incompressible fluid.

The effect of incorporating an underspring having a variable spring force is graphically illustrated in FIG. 7 by the dashed line 60 for an incompressible fluid, and by the solid line 62 for a compressible fluid. The dashed and solid lines 60, 62 represent the pressure profile on the foil 20 supported by the variable pitch, variable spring rate underfoil 22 of the present invention. For comparison purposes, the pressure profile exerted on the surface of a foil is depicted by the dotted line 64, for a constant pitch, uniform spring rate underfoil of the prior art. As shown, the maximum pressure is increased, as is the total area under the curve which results in a greater load carrying capacity for the variable spring rate of underspring 22, 52 of the present invention.

By way of example only and for completeness of this disclosure, a preferred configuration of the incompressible fluid underspring 22 depicted in FIG. 3 having eight beams has the following relative widths for the active pad area.

| Dimension | Range of Wn as % of Wa |
| --- | --- |
| Wa | — |
| Wb | 94%–98% |
| Wc | 85%–95% |
| Wd | 80%–90% |
| We | 80%–90% |
| Wf | 75%–85% |
| Wg | 75%–85% |

-continued

| Dimension | Range of Wn as % of Wa |
| --- | --- |
| Wh | 85%–90% |

Figure 8C:
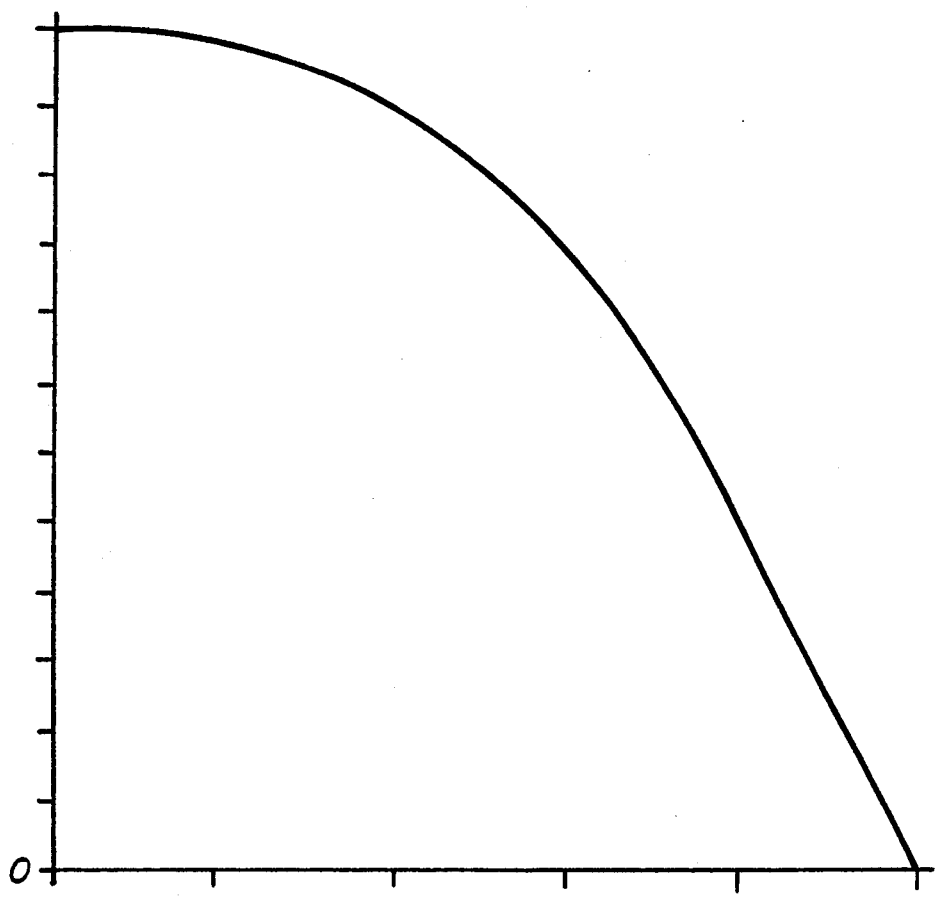
FIGS. 8A, 8B, and 8C are exploded views of the axial edge of the foil journal bearing for two configurations of the underspring, and a graphical illustration of the pressure at the edge of the foil.
Figure 8A:
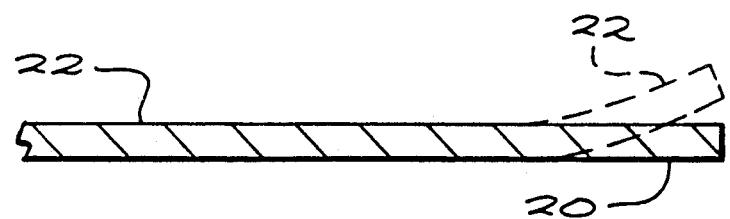
Figure 8B:
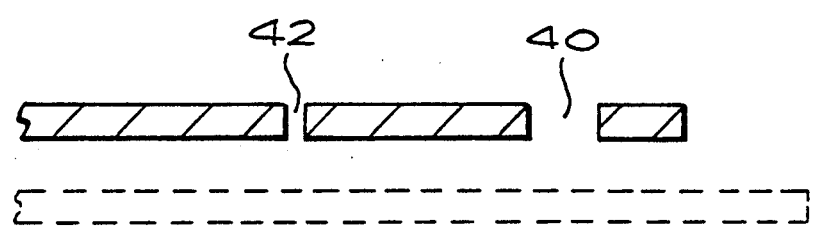

FIG. 8 depicts exploded cross sectional views of an edge portion of the foil bearing along an axial length of the rotating members 12 and 14, and the associated pressure profile on the foil 20. In these views, the effect of the windows 42, 44 on the loading close to the axial ends of the foil 20 is illustrated. An exploded view of a portion of an underspring 70 which does not include the windows is depicted by dashed lines superimposed on the cross-sectional view of a portion of the underspring 22 including the windows 42. The underspring 70 exerts a constant force across the entire axial length of the foil 20. However, the fluid pressure between the foil 20 and the shaft 12 drops to zero at the edge of the foil 20 as depicted by the graphical representation of the pressure. Thus, the underspring urges the edge of the foil 20 upward, causing rubbing contact with the shaft 12. By comparison, the edge of foil 20 for an underspring which includes the windows 40, 42, and which overhangs the underspring is shown by the solid lines. For this arrangement, the underspring exerts a decreasing spring force over the outer 1.5 cm to 0.1 cm of the foil. Thereby, the spring force at the axial edge of the foil 20 is substantially reduced in conjunction with the reduction of the fluid pressure between the foil 20 and shaft 12. By this arrangement, the rubbing contact at the axial edge of foil 20 is substantially reduced or even eliminated.

It should be evident from the foregoing description that the present invention provides advantages over foil journal bearings of the prior art. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. A journal foil bearing comprising:
a journal member;
a shaft member arranged for relative coaxial rotation with respect to said journal member;
a compliant foil bearing disposed between said shaft and journal members, said compliant foil bearing including at least one foil element mounted to said journal member; and
means for providing a variable underspring force for supporting said foil element and maintaining an approximately optimum wedge shaped uniform spacing between said foil element and said rotating shaft member matched to the changing pressure force along the circumferential length of said foil element; and
wherein said means for providing a variable underspring force comprises: an underspring positioned between said foil element and said journal member to which said foil member element is mounted, said underspring including a plurality of curvilinear beams extending a majority of the axial length of said underspring, said curvilinear beams separated by a plurality of generally "I" shaped slots, said "I" shaped slots extending axially along said underspring.

2. The journal foil bearing of claim 1 wherein said curvilinear beams further include means for decreasing the spring force of said curvilinear beams proximate the axial ends of said curvilinear beams to reduce the spring force exerted upon said overlying foil element proximate the axially outer edges of said foil element.

3. The journal foil bearing of claim 2 wherein said means for decreasing the spring force comprises at least one window through said beam proximate the end of said curvilinear beams.

4. The journal foil bearing of claim 1 wherein aid underspring is configured to have wider curvilinear beams at a leading edge of said underspring supporting a leading edge of the active surface area of said foil element, and progressively narrower curvilinear beams for approximately the first one half of the circumferential length of said underspring, to provide a weaker spring force supporting said overlying foil element at said leading edge, and an increasing spring force supporting said foil element reaching a maximum supporting spring force at about the midpoint of said underspring.

5. The journal foil bearing of claim 4 wherein said spring force of said underspring is relatively constant from said midpoint to said trailing edge of said underspring for compressible fluid applications.

6. The journal foil bearing of claim 4 wherein said spring force of said underspring decreases from about the midpoint of said underspring to the trailing edge of said underspring for incompressible fluid applications.

7. The journal foil bearing of claim 4 wherein said underspring further comprises:
means for mounting said underspring to said journal, said means defined by an axially aligned mounting bar or tab located at a circumferential edge of said underspring.

8. The journal foil bearing of claim 4 wherein said undersprings are formed from a thin compliant metallic material selected from the group consisting of nickel alloy, beryllium-copper, and stainless steel.

9. The journal foil bearing of claim 4 wherein said curvilinear beams have a width W in the range between 0.025 cm to 1.0 cm.

10. The journal foil bearing of claim 1 wherein individual of said curvilinear beams of said underspring have width and pitch dimensions which depend upon the relative location between a leading edge and a trailing edge of said underspring.

11. The journal foil bearing of claim 3 wherein said pitches of said curvilinear beams varies in order to provide a uniform support height for said foil elements, and said "I" shaped slots have a width W, said width of said "I" shaped slot between said curvilinear beams located proximate said leading edge of said underspring being greater than the remaining "I" shaped slots.

12. The journal foil bearing of claim 11 wherein said "I" shaped slots extend a majority of the axial length of said underspring 22, and said curvilinear beams connected to axial edges of said underspring by short bars defined by the top and bottom crossbeams of said "I" shaped slots.

13. A journal foil bearing comprising:
a journal member;
a shaft member arranged for relative coaxial rotation with respect to said journal member;

a compliant foil bearing disposed between said shaft and journal members, said compliant foil bearing including at least one foil element mounted to said journal member; and means for providing a variable underspring force for supporting said foil element and maintaining an approximately optimum wedge shaped uniform spacing between said foil element and said rotating shaft member matched to the changing pressure force along the circumferential length of said foil element; and wherein said means for providing a variable underspring force comprises: an underspring positioned between said foil element and said member upon which said foil element is mounted, said underspring including a plurality of corrugations, said underspring configured to have wider corrugations at a leading edge of said underspring supporting a leading edge of the active surface area of said foil element, and progressively narrower corrugations for approximately the first one half of the circumferential length of said underspring, to provide a weaker spring force supporting said overlying foil element at said leading edge, and an increasing spring force supporting said foil element reaching a maximum supporting spring force at about the midpoint of said underspring.

14. The journal foil bearing of claim 13 wherein said undersprings are formed from a thin compliant metallic material selected from the group consisting of nickel alloy, beryllium-copper and stainless steel.

15. The journal foil bearing of claim 13 wherein said spring force of said underspring is relatively constant from said midpoint to said trailing edge of said underspring for compressible fluid applications.

16. The journal foil bearing of claim 13 wherein said spring force of said underspring decreases from about the midpoint of said underspring to the trailing edge of said underspring for incompressible fluid applications.

17. The journal foil bearing of claim 13 wherein said the pitch of said corrugations varies and the height of said corrugations is selected to provide a wedge shape support height for said foil elements.

18. The journal foil bearing of claim 13 wherein said underspring further comprises:

means for mounting said underspring to said journal, said means defined by an axially aligned mounting bar or tab located at a circumferential edge of said underspring.

19. The journal foil bearing of claim 13 wherein said corrugations have a width W in the range between 0.025 cm to 1.0 cm.

20. The journal foil bearing of claim 13 wherein said corrugaitons further include means for decreasing the spring force of said corrugations proximate the axial ends of said corrugations to reduce the spring force exerted upon said overlying foil element proximate the axially outer edges of said foil element.

21. The journal foil bearing of claim 20 wherein said means for decreasing the spring force comprises at least one window through said beam proximate the end of said corrugations.

* * * * *